(12) United States Patent
Smarrito-Menozzi et al.

(10) Patent No.: US 10,687,548 B2
(45) Date of Patent: *Jun. 23, 2020

(54) CREAMER COMPOSITIONS

(71) Applicant: NESTEC S.A., Vevey (CH)

(72) Inventors: Candice Marie Smarrito-Menozzi, Belmont-sur-lausanne (CH); Florian Viton, Lausanne (CH); Walter Matthey-Doret, Prilly (CH)

(73) Assignee: Societe des Produits Nestle S.A., Vevey (CH)

( * ) Notice: Subject to any disclaimer, the term of this patent is extended or adjusted under 35 U.S.C. 154(b) by 33 days.

This patent is subject to a terminal disclaimer.

(21) Appl. No.: 15/558,405

(22) PCT Filed: Mar. 8, 2016

(86) PCT No.: PCT/EP2016/054871
§ 371 (c)(1),
(2) Date: Sep. 14, 2017

(87) PCT Pub. No.: WO2016/146430
PCT Pub. Date: Sep. 22, 2016

(65) Prior Publication Data
US 2018/0055079 A1   Mar. 1, 2018

(30) Foreign Application Priority Data

Mar. 19, 2015 (EP) .................... 15159893

(51) Int. Cl.
*A23C 11/00* (2006.01)
*A23L 27/21* (2016.01)
*A23L 27/20* (2016.01)

(52) U.S. Cl.
CPC ............ *A23L 27/215* (2016.08); *A23C 11/00* (2013.01); *A23L 27/206* (2016.08); *A23V 2002/00* (2013.01)

(58) Field of Classification Search
CPC ....... A23L 27/215; A23L 27/206; A23C 11/00
See application file for complete search history.

(56) References Cited

U.S. PATENT DOCUMENTS

| 10,136,666 B2 * | 11/2018 | Oertling ............... A23L 27/215 |
| 2004/0062846 A1 * | 4/2004 | Sargent ............... A23C 9/1512 |
| | | 426/601 |

FOREIGN PATENT DOCUMENTS

| CN | 104365983 | 2/2015 | |
| WO | WO-2012072630 A1 * | 6/2012 | ............. A23F 5/243 |
| WO | 2013011148 | 1/2013 | |
| WO | 2013061972 | 5/2013 | |
| WO | WO-2014023805 A1 * | 2/2014 | ............. A23C 11/04 |

OTHER PUBLICATIONS

Newton, "The role of the Maillard reaction in the formation of flavour compounds in dairy products—not only a deleterious reaction but also a rich source of flavour compounds", Food and Function, 2012, 3, pp. 1231-1241.*
Patent Abstract of Japanese Patent No. 56042546 "Coffee whitener not causing feathering—contains phytosterol, sucrose fatty acid ester, protein and fat" 1 page, XP002285302.

* cited by examiner

*Primary Examiner* — Nikki H. Dees
*Assistant Examiner* — Changqing Li
(74) *Attorney, Agent, or Firm* — K&L Gates LLP

(57) ABSTRACT

The present invention relates to processes for manufacturing creamer compositions. Further aspects of the invention relate to a creamer composition, the use of a creamer composition, a food ingredient, a food product and a process for providing a coffee mix.

15 Claims, 9 Drawing Sheets

CREAMER COMPOSITIONS

CROSS REFERENCE TO RELATED APPLICATIONS

The present application is a National Stage of International Application No. PCT/EP2016/054871, filed on Mar. 8, 2016, which claims priority to European Patent Application No. 15159893.5, filed on Mar. 19, 2015, the entire contents of which are being incorporated herein by reference.

FIELD OF THE INVENTION

The present invention relates to processes for manufacturing a creamer composition. Further aspects of the invention relate to a creamer composition, the use of a creamer composition, a food ingredient, a food product and a process for providing a coffee mix.

BACKGROUND OF THE INVENTION

Creamers are widely used as whitening agents with hot and cold beverages such as, for example, coffee, cocoa, tea, etc. They are commonly used in place of milk and/or dairy cream. Creamers may come in a variety of different flavours and provide mouthfeel, body, and a smoother texture. Creamers can be in liquid or powder forms. A liquid creamer may be intended for storage at ambient temperatures or under refrigeration, and should be stable during storage without phase separation, creaming, gelation and sedimentation. The creamer should also retain a constant viscosity over time. When added to cold or hot beverages such a coffee or tea, the creamer should dissolve rapidly, provide a good whitening capacity, and remain stable with no feathering and/or sedimentation while providing a superior taste and mouthfeel. Mouthfeel, also denoted richness, texture or creaminess, is usually provided by an oil emulsion present in the creamer.

Flavours may be added to creamers, for example US20140044854 describes adding flavours such as vanilla to a creamer. It would be advantageous to be able to add complex flavour notes to creamers in an efficient manner. These would enhance the flavour of the beverage with which the creamer was combined. Although many commercially extracted and synthesised flavours are available, different aroma compound mixtures provide different sensory characteristics. There is a need to provide new flavour generation processes which can efficiently generate desirable mixtures of aroma compounds, preferably in reaction mixtures suitable for direct incorporation into foodstuffs such as creamers.

An object of the present invention is to improve the state of the art and to provide an improved solution to overcome at least some of the inconveniences described above, or at least to provide a useful alternative. Any reference to prior art documents in this specification is not to be considered an admission that such prior art is widely known or forms part of the common general knowledge in the field. As used in this specification, the words "comprises", "comprising", and similar words, are not to be interpreted in an exclusive or exhaustive sense. In other words, they are intended to mean "including, but not limited to". The object of the present invention is achieved by the subject matter of the independent claims. The dependent claims further develop the idea of the present invention.

SUMMARY OF THE INVENTION

Accordingly, the present invention provides in a first aspect a process for manufacturing a creamer composition, the process comprising providing a flavour precursor composition comprising at least one polyol and at least one amino compound selected from the group consisting of amino acids, amino acid derivatives and peptides; heating the flavour precursor composition to generate a process flavour composition; and mixing the process flavour composition with an aqueous creamer component. The invention also provides a creamer composition obtainable by the process of the invention and the use of such a creamer composition in a beverage mix. Further aspects of the invention are a food ingredient comprising the creamer composition of the invention, a food product comprising the food ingredient and a process for providing a coffee mix, the process comprising manufacturing a creamer composition according to the process of the invention and combining the creamer composition with soluble coffee, thereby providing a coffee mix.

The inventors have found that a creamer composition with complex aroma, particularly well-suited for complementing the taste and aroma of coffee, cocoa or tea may efficiently be prepared by generating aromas by thermally reacting flavour precursors, mixing the result with aqueous components of a creamer and then producing a creamer composition.

In one embodiment of the invention, solid flavour precursors may be combined to form a low moisture-content liquid eutectic mixture before being heated. The inventors were surprised to find that this approach was particularly efficient at generating high yields of attractive aromas, and provided materials which had good processability.

DETAILED DESCRIPTION OF THE INVENTION

Figure 1:
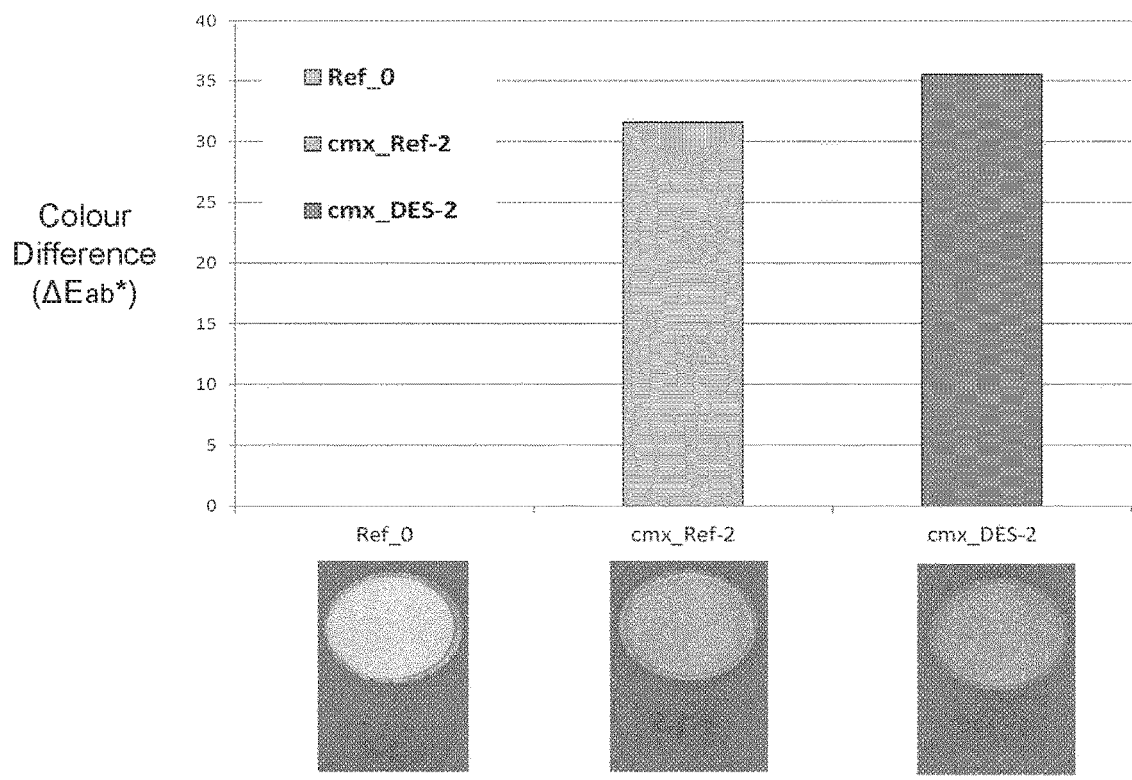
FIG. 1 shows colour measurements of creamer powders from Example 1; Ref_0 with no flavour precursor, cmx_Ref-2 with flavour precursors prepared without a liquid eutectic mixture and cmx_DES-2 with flavour precursor prepared using a liquid eutectic mixture.

Consequently the present invention relates in part to a process for manufacturing a creamer composition, the process comprising providing a flavour precursor composition comprising at least one polyol and at least one amino compound selected from the group consisting of amino acids, amino acid derivatives and peptides; heating the flavour precursor composition to generate a process flavour composition; and mixing the process flavour composition with an aqueous creamer component. An amino acid derivative is a compound that is derived from an amino acid compound by some chemical process. An example of an amino acid derivative is dihydroxyphenylalanine, a beta-hydroxylated derivative of phenylalanine. The at least one amino compound may be an amino acid.

A flavour composition is a composition which provides aroma and taste, for example when added to a foodstuff. Flavour compositions obtained by heat treatment of a mixture of ingredients are commonly called process flavours, for example thermal process flavours, or reaction flavours. Flavour compositions may include molecules which are not aromas themselves but which generate aroma when further processed, for example during baking. The process flavour composition prepared by the process of the invention may be a "thermal process flavouring" as defined by Regulation (EC) No 1334/2008 of the European Parliament and of the Council of 16 Dec. 2008.

Process flavours are complex building blocks that provide similar aroma and taste properties to those found in thermally treated foodstuffs such as meat, chocolate, coffee, caramel, popcorn and bread. The complex chemistry behind those flavour generating reactions is commonly termed "Maillard" chemistry. This has been described by many sources [M. K. Sucan et al., "Process and Reaction Flavors", ACS Symposium Series 2005, 905, 1-23].

The aromas and flavours generated by heating the flavour precursor composition of the invention particularly complement the taste and aromas of beverages such as coffee, cocoa or tea. However, adding flavours to materials such as coffee is generally not permitted under strict labelling rules governing the purity of these materials. It is therefore beneficial to be able to add the process flavours to a creamer to further enhance the taste and aroma of the beverage material with which it is consumed.

The flavour precursors of the process of the invention are those well known in the art, for example flavour precursors which take part in the Maillard reaction. The Maillard reaction is most commonly known as the reaction of an amino group, e.g. an amino acid, peptide or protein, with the carbonyl group of a sugar, followed by a complex reaction pathway which results in the formation of a variety of volatiles and non-volatiles.

Generally, Maillard chemistry is most effective in generating flavour components when the water activity is low, for example when a slurry of solid flavour precursors are heated in a small amount of water. However, such semi-solid materials are difficult to process industrially, being difficult to pump without blockages and being difficult to react homogeneously, leading to inconsistent flavour generation. The inventors were surprised to find that by forming a liquid eutectic mixture of the flavour precursors with a small quantity of water or glycerol and then heating the liquid eutectic mixture they were able to generate process flavours more consistently and with better yields. Obtaining higher yields allows less flavour precursor material to be used and so reduces cost. The at least one polyol and at least one amino compound in the process of the invention may be materials solid at 25° C. and the at least one polyol and at least one amino compound may be combined with water and/or glycerol to form a liquid eutectic mixture, the amount of water and/or glycerol being insufficient to dissolve at least one of the polyols or amino compounds individually at 25° C., or the amount of water and/or glycerol being such that all the polyols and the amino compounds are simultaneously saturated at 25° C. For example the at least one polyol and at least one amino compound in the process of the invention may be materials solid at 25° C. and the at least one polyol and at least one amino compound may be combined with water to form a liquid eutectic mixture, the amount of water being insufficient to dissolve at least one of the polyols or amino compounds individually at 25° C., or the amount of water being such that all the polyols and the amino compounds are simultaneously saturated at 25° C.

For example a liquid eutectic mixture may be formed by mixing 47 g β-alanine, 149 g sorbitol and 60 g of water to form a liquid. β-alanine is an amino compound (an amino acid) solid at 25° C. and sorbitol is a polyol, solid at 25° C. From literature values only about 33 g β-alanine would dissolve in 60 g water at 25° C., so the solubility of β-alanine in water is not high enough for 47 g β-alanine to dissolve in 60 g water. However, in the presence of the sorbitol, the mixture can form a liquid, a liquid eutectic mixture. The melting point of this liquid eutectic mixture is below −40° C., so it has a melting point that is much lower than the melting point of the compounds which form the eutectic mixture (this is sometimes referred to as a deep eutectic solvent or a deep eutectic system (DES)). A melting point of −40° C. is at least 40° C. lower than the lowest melting point of the compounds which form the liquid eutectic mixture (water 0° C., sorbitol 95° C. and β-alanine 207° C.). The liquid eutectic mixture formed from the at least one polyol and the at least one amino compound combined with water and/or glycerol in the process of the invention may have a melting point at least 20° C. lower than the lowest individual melting point of the compounds which form the liquid eutectic mixture, for example at least 30° C. lower than the lowest individual melting point of the compounds which form the liquid eutectic mixture.

The at least one amino compound in the process of the invention may be selected from the group consisting of glycine, alanine, valine, norvaline, leucine, norleucine, aspartic acid, glutamic acid, asparagine, glutamine, arginine, lysine, serine, threonine, proline, tyrosine, cysteine, cystine, methionine, phenylalanine, histidine, tryptophan, dihydroxyphenylalanine, taurin, thiamine, carnosine and mixtures of these. Such amino compounds are particularly suitable as flavour precursors as they generate a range of aromas when reacted with polyols and are edible.

The at least one polyol in the process of the invention may be a reducing sugar. A reducing sugar is any sugar that either has an aldehyde group or is capable of forming one in solution through isomerism. Reducing sugars include aldoses or ketoses such as glucose, fructose, maltose, lactose, glyceraldehyde, dihydroxyacetone, arabinose, xylose, ribose, mannose, erythrose, threose, and galactose. The at least one polyol in the process of the invention may be an alkane polyol. Suitable alkane polyols include for example glycerol, erythritol, xylitol, ribitol, sorbitol, dulcitol, mannitol, isomalt, maltitol and lactitol. The at least one polyol in the process of the invention may be selected from the group consisting of glycerol; sorbitol; glucuronic acid; 5-ketogluconic acid; galacturonic acid; iduronic acid; maltodextrin; glucose syrup; rhamnose; xylose; glucose; fructose; sucrose; lactose; maltose, xylitol, maltitol, erythritol, mannitol and mixtures of these. The at least one polyol in the process of the invention may be selected from the group consisting of rhamnose, xylose, fructose and combinations of these, and the at least one amino compound may be selected from the group consisting of glycine, lysine and combinations of these. The at least one polyol in the process of the invention may be xylose and the at least one amino compound may be proline. The at least one polyol in the process of the invention may be selected from the group consisting of dextrose, rhamnose, xylose and combinations of these, and the at least one amino compound may be proline. The inventors have found that these polyols and amino compounds produce particularly suitable process flavours for incorporation into a creamer to complement the taste and aroma of beverages such as coffee.

Some aromas are preferentially produced under basic conditions; accordingly the flavour precursor composition in the process of the invention may comprise an alkali. The alkali may be for example sodium hydroxide, potassium hydroxide, sodium hydrogen carbonate, disodium hydrogen phosphate or sodium hydrogen sulphite. The alkali may be disodium hydrogen phosphate. The alkali may be comprised within a buffer solution such as a phosphate buffer ($NaH_2PO_4/Na_2HPO_4$). The alkali may also be part of a liquid eutectic mixture. For example the at least one polyol, the at least one amino compound and the alkali in the process of the invention may be materials solid at 25° C. and the at least one polyol, at least one amino compound and alkali may be combined with water and/or glycerol to form a liquid eutectic mixture, the amount of water and/or glycerol being insufficient to dissolve at least one of the polyols, amino compounds or alkali individually at 25° C., or the amount of water and/or glycerol being such that all the polyols, the amino compounds and the alkali are simultaneously saturated at 25° C.

The flavour precursor composition may comprise an oil, for example the flavour precursor composition may be dispersed in oil. Many flavours and aromas are soluble in oil, and so when the flavour precursor composition is heated, aromas are more efficiently retained by the having a flavour precursor composition comprising an oil. The oil may be a triglyceride-based oil, for example the oil may comprise at least 95 wt. % of triglycerides. The oil may have a melting point below 50° C., for example below 40° C. Typically the oil is liquid at the temperature at which the flavour precursor composition is heated. The oil may be selected from the group consisting of mango kernel oil, palm kernel oil, palm oil, canola oil, milk fat, corn oil, coconut oil, soybean oil, rapeseed oil, cottonseed oil, sunflower oil, safflower oil, and hydrogenation products, inter-esterification products, fractions and combinations of these. Preferably the oil may be selected from the group consisting of palm kernel oil (for example hydrogenated palm kernel oil), canola oil, soy bean oil, sunflower oil, safflower oil, cotton seed oil, palm oil, milk fat, corn oil, and/or coconut oil. Preferably, the same oil is a component of the creamer. It is advantageous to use an oil which does not increase the number of ingredients in the creamer. The oil may be palm kernel oil, for example fractions and/or hydrogenation products of palm kernel oil. The oil may be sunflower oil. The oil may be hydrogenated palm kernel oil. It is advantageous to use an oil which does not increase the total oil content of the creamer, for example by using part of the oil from the standard creamer recipe as the oil comprised within the flavour precursor composition. As the flavour precursor composition becomes the process flavour composition after heating, the addition of oil to the flavour precursor composition effectively adds oil to the process flavour composition. Oil is a typical component of a creamer, for example being emulsified with aqueous creamer components. The flavour precursor composition may comprise an oil and the process flavour composition may be mixed with the aqueous creamer component so as to form an oil-in-water emulsion, for example the process flavour composition may be mixed with the aqueous creamer component and additional oil so as to form an oil-in-water emulsion. The process flavour composition mixed with the aqueous creamer component preferably further comprises an emulsifier. Emulsifiers are usually mixed into the oil but may also be added to the aqueous phase. The oil-in-water emulsion may be pasteurised, for example maintained at a minimum temperature of 81° C. for at least 5 seconds.

The oil may be present in the creamer composition in an amount of at most about 50% (weight/weight), the amount of oil in the creamer composition may e.g. be between 1% and 40% (weight/weight), such as in the range 5-40%, such as in the range 10-40, such as in the range 5-30%, or such as in the range between 10-30%.

The process for manufacturing a creamer composition may comprise a drying step to form a concentrated or powdered creamer composition. For example an oil-in-water emulsion comprising the aqueous creamer component mixed with the process flavour composition may be dried to a powder. Drying may be performed by performed by spray drying, vacuum band drying, roller drying or freeze drying. An oil-in-water emulsion comprising the aqueous creamer component mixed with the process flavour composition may be dried to a powder by spray-drying.

Sweeteners are commonly present in creamer compositions. The sweetener may, at least in part, be a polyol originally comprised within the flavour precursor composition but which has not been completely reacted away during the heating of the flavour precursor composition to generate a process flavour composition. A sweetener, for example additional sweetener, may be added to the process flavour composition or the aqueous creamer component. The sweetener added to the process flavour composition or the aqueous creamer component may for example be a polyol of the same type as comprised within the flavour precursor composition. It is advantageous to limit the number of ingredients in a creamer, both for efficiency in the factory and to have a shorter ingredient list which may be more appealing to a consumer. Usage level of the sweetener will vary greatly and will depend on such factors as potency of the sweetener, desired sweetness of the product, level and type of flavour used and cost considerations. Combinations of sugar and/or sugarless sweeteners may be used. Sweeteners can include, for example, sucrose, fructose, dextrose, maltose, dextrin, levulose, tagatose, galactose, corn syrup solids and other natural or artificial sweeteners. The sweetener may be glucose syrup, e.g. hydrogenated starch syrup. Sugarless sweeteners can include, but are not limited to, sugar alcohols such as maltitol, xylitol, sorbitol, erythritol, mannitol, isomalt, lactitol, hydrogenated starch hydrolysates, and the like, alone or in combination.

The aqueous creamer component in the process of the invention may comprise protein. The protein may be any suitable protein, e.g. milk protein, such as casein, caseinate, and whey protein; vegetable protein, e.g. soy and/or pea protein; and/or combinations thereof. The protein is preferably sodium caseinate. The protein in the composition may work as an emulsifier, provide texture, and/or provide whitening effect. Too low levels of protein may reduce the stability of a liquid creamer. At too high protein levels the viscosity of the product may be higher than desired and too high for liquid processing.

A further aspect of the invention is a creamer composition obtainable, for example obtained, by the process of the invention. The product obtained by the process according to the invention has properties different from creamers where a process flavour composition is not generated and mixed with an aqueous creamer component. For example, aromas profile of the creamers obtainable by the process of the invention are different from known creamers, as explained in example 2. The creamer composition of the invention may comprise 5-methylfurfural, 1-hydroxy-2-propanone and furaneol wherein the ratios of 5-methylfurfural to furaneol and the ratio of 1-hydroxy-2-propanone to furaneol are both greater than 4:1, for example greater than 5:1. The ratios between 5-methylfurfural, 1-hydroxy-2-propanone and furaneol may be calculated based on the ratios of their peak areas to an internal standard of 1-pentanol in a headspace analysis by GC-MS. The creamer of the invention may contain at least 100 µg/g of furaneol, for example at least 150 µg/g of furaneol, for example least 200 µg/g of furaneol. The creamer of the invention may contain at least 1 µg/g of 5-methylfurfural, for example at least 1.5 µg/g of 5-methylfurfural, for example at least 2 µg/g of 5-methylfurfural. 5-methylfurfural has a pleasant sweet aroma. The creamer composition may comprise colourants (for example brown colourants) being Maillard reaction products. The creamer composition may be a liquid creamer composition or a powder creamer composition. The creamer composition may be a dairy creamer or a non-dairy creamer.

In a further aspect, the invention provides the use of a creamer composition of the invention in a beverage mix, such as a coffee mix. Coffee mixes are powdered products used to prepare e.g. cappuccino and other coffee beverages containing a milk component. They normally consist of a simple dry mixture of soluble coffee powder, creamer powder (milk component) and sweetener (e.g. sugar). The invention also relates to a process for providing coffee mixes. Thus, a still further aspect of the invention relates to a process for providing a coffee mix, the process comprising manufacturing a creamer composition according to the invention and combining the creamer with soluble coffee, thereby providing a coffee mix.

The creamer composition according to the invention may also form part of a food ingredient. Thus, an aspect of the invention relates to a food ingredient comprising the creamer composition according to the invention. In an embodiment the creamer composition constitutes from 5-100% by weight of the food ingredient. In case of 100% the creamer constitutes a food ingredient in its own right.

The creamer composition according to the invention may also form part of a food product. Thus, an aspect of the invention relates to a food product comprising the food ingredient according to the invention. In an embodiment the product is selected from the group consisting of coffee mixes, such as dry coffee powders, cappuccino powders, beverages, teas, desserts and cakes.

A further aspect of the invention is a process for providing a coffee mix, the process comprising manufacturing a creamer composition according to the process of the invention and combining the creamer composition with soluble coffee, thereby providing a coffee mix. For example a powdered creamer may be manufactured according to the process of the invention for manufacturing a creamer composition and then dry mixed with sugar and soluble coffee powder to form a coffee mix.

Those skilled in the art will understand that they can freely combine all features of the present invention disclosed herein. In particular, features described for the product of the present invention may be combined with the method of the present invention and vice versa. Further, features described for different embodiments of the present invention may be combined. Where known equivalents exist to specific features, such equivalents are incorporated as if specifically referred to in this specification.

Further advantages and features of the present invention are apparent from the figures and non-limiting examples.

EXAMPLES

Example 1: Preparation of Flavoured Creamer Powders: Xylose and Proline

A flavour precursor composition was prepared by combining 1.699 kg xylose, 2.355 kg proline, 0.110 kg disodium hydrogen phosphate, 1.1161 kg water and 43.89 kg hydrogenated palm kernel oil. The quantity of water would be sufficient to dissolve any of the polyols or amino compounds individually at 25° C. The mixture was heated in a closed reactor at 110° C. for 40 min and then cooled down to room temperature to generate a process flavour composition (REF-TPF_2).

Another flavour precursor composition was prepared, this time as a liquid eutectic mixture, by combining 1.699 kg xylose, 2.355 kg proline, 0.110 kg disodium hydrogen phosphate and 1.1161 kg water. The components were mixed until the all components dissolved and a homogeneous liquid was formed (sample DES_2). This was a liquid eutectic mixture as the maximum solubility of proline at 25° C. is around 1744 g/L, so taken individually 2.355 kg proline would not dissolve in 1.1161 kg water. 43.89 kg hydrogenated palm kernel oil was mixed with 5.33 kg DES_2. The mixture was heated in a closed reactor at 110° C. for 40 min and then cooled down to room temperature to generate a process flavour composition (DES-TPF_2).

Creamers were then prepared. Typical non-dairy creamer ingredients (sodium caseinate, dipotassium phosphate, sodium hexametaphosphate and trisodium citrate) were mixed in water and stirred at 50° C. These aqueous creamer components were then mixed with the process flavour composition (containing oil) to which emulsifiers monoglyceride Dimodan™ and Panodan™ had been added. The mixture was stirred at 50° C. and glucose syrup was added. The final mix was homogenized to form an emulsion and pasteurized (85° C. for 5 seconds). The pasteurized mix was then spray-dried at 160° C. to form a creamer powder. Creamer CMX-REF2 was prepared with process flavour REF-TPF_2, and creamer CMX-DES2 with process flavour DES-TPF_2. A third creamer, cmx_Ref_0, was prepared with no added flavour (the oil-containing process flavours being replaced by just palm kernel oil).

Extent of Reaction (Colour):

The creamer colour was measured using a DigiEye "Digipix" color Edge CG243w system (Visual quality control). The samples were placed upon a neutral grey background within the DigiEye Cube, allowing the image to be captured in a controlled, consistent and standardized environment. The lighting used closely matches the CIE D65 lighting (no work up, 3 replicates). The CIE 1976 L*a*b* (hereinafter CIELAB) colour scale is one method of measuring colour proposed by the Commission Internationale de l'Éclairage (CIE) [CIE Technical Report, Colorimetry $2^{nd}$ Edition, CIE 15.2—1986, corrected reprint 1996]. The CIELAB colour space is produced by plotting the quantities L*, a*, b* in rectangular coordinates. The L* coordinate of an object is the lightness intensity as measured on a scale from 0 (black) to 100 (absolute white). The a* and b* coordinates have no specific numerical limits. The parameter a* runs from pure green (negative a*) to pure red (positive a*), while b* runs from pure blue (negative b*) to pure yellow (positive b*).

In the CIELAB colour space, colour difference may be calculated as a single value taking into account the differences between the L*, a* and b* values of two samples.

The colour difference ΔEab* is calculated as follows:

$$\Delta Eab^* = \sqrt{(\Delta L^*)^2 + (\Delta a^*)^2 + (\Delta b^*)^2}$$

Colour measurements were performed on the two flavoured creamer powders, measuring the colour difference ΔEab* compared to the un-flavoured creamer powder cmx_Ref_0. Color measurement represents a good indicator of the advancement of the Maillard Reaction (browning degree). As shown in FIG. 1, ΔEab* for CMX-DES2 was greater than the one of CMX-REF2 meaning that the browning, and thus Maillard reaction was more advanced when compounds were pre-combined as a liquid eutectic mixture before the heating step.

Extent of Reaction (Residual Precursors):

To investigate the extent of reaction of the flavour precursors the residual xylose and proline was quantified.

Quantification of Residual Xylose:

100 mg creamer powder was dissolved in 1 mL water. The oil was removed by successive extraction with pentane (8 mL×3). The aqueous layers were diluted to 10 mL and centrifuged at 3400 t/min for 20 min at 8° C. The resulting solution was then diluted (450 μL for 1 mL). Residual xylose was quantified by high performance ion-exchange chromatography using an ICS-5000 ion chromatography system from Dionex (Thermo Fisher Scientific, 81 Wyman Street, Waltham, Mass. 02454, US) equipped with an AS-50 autosampler, OH— eluent generator, a degasser, a column oven and a pulsed amperometry detector. The column was a Carbopac (PA1, 2×250 mm) coupled with a guard column (2×50 mm), both purchased from Dionex. The eluent was deionised water and the hydroxide (OH—) was produced by an Eluent Generator (KOH cartridge EGCIII) and released in the flow through a membrane (0.4 mL/min). Elution was an isocratic elution, fixed at 20 mM [OH—] from 0 to 49 min. Xylose was identified by comparing retention time with that of corresponding reference standard and was quantified using calibration curve.

Quantification of Residual Proline:

The quantification of residual proline was carried out by Triple quad/LC-MS: After extraction with pentane, the samples were diluted in Millipore water, filtered (0.45 μm, disposable syringe filter for aqueous sample) and diluted with a mix of labelled standards (Dr Ehrenstorfer CDN Isotopes) composed of seven labelled AA (L-alanine-2-d1, glycine-2,2-d2, L-phenyl-d5-alanine, L-proline-2,5,5-d3, L-serine-2,3,3-d3, L-threonine-2,3-d2, L-valine-d8) in a concentration of 100 μM (final concentration: 50 μM).

Table below shows the mass transition of standards and proline.

| Substance | MW [Da] | Q1→Q3 [m/z] | Frag$^a$ [V] | CE$^b$ [V] | Cell Acc$^c$ [V] |
|---|---|---|---|---|---|
| L-Serine-D$_3$ | 108 | 109 → 63 | 80 | 8 | 7 |
| L-Alanine-d$_1$ | 90 | 91 → 45 | 15 | 8 | 7 |
| L-Phenylalanine-d$_5$ | 170 | 171 → 125 | 110 | 8 | 7 |
| L-Threonine-d$_2$ | 121 | 122 → 76 | 80 | 8 | 7 |
| L-Glycine-d$_2$ | 77 | 78 → 32 | 15 | 8 | 7 |
| L-Valine-d$_8$ | 125 | 126 → 80 | 80 | 8 | 7 |
| L-Proline | 115 | 116 → 70 | 85 | 13 | 7 |
| L-Proline-d$_3$ | 118 | 119 → 73 | 80 | 8 | 7 |

$^a$fragmentation voltage;
$^b$Collision energy;
$^c$Cell energy

The samples and the standards for calibration were injected in HILIC HPLC-MS-QQQ (Agilent 1290 Infinity system) to quantify the unreacted glycine and lysine. The samples were directly separated on a Hydrophilic Interaction Liquid Chromatography (HILIC) column (TOSOH BIOSEP; HILIC, TSK gel Amide-80, dimension 4.6 mm ID×15 cm, particle size 3. μm.), especially designed for the separation of hydrophilic polar and ionic analysts. The column temperature was maintained constant at 35° C. Mixes of acetonitrile/water/formic acid 10/90/0.1 (A) and 90/10/0.1 ratio (B) were used as eluents. The flow rate was 0.8 mL/min. The solvent gradient started at 75% (eluent B) at 0 min and stayed unchanged for 5 min then it was reduced at 50% B in 1 min and remained stable for 4 min. The gradient came back at 75% B in 1 min and the run was finished 4 min later. The runtime was 15 min with an additional post-time minute before the next injection. In the source (ESI), the gas temperature and the flow were respectively 300° C. and 5.1 l/min and the nebulizer was set at 45 psi. The sheath Gas Heater and flow were 255° C. and 11 l/min. The capillary voltage was set at 3,000 V (+) and 2,000 V (−) and the nozzle voltage was 500 V. The mix of labelled amino acids was used as standard to create the calibration curve for quantification (5-50 µM by step of 5 µM. The data collected were treated in order to deliver the amount of the free amino acids in each sample, based on the 10 point calibration curve.

Volatile compounds are formed by the condensation of reducing sugars and amino acids (Maillard reaction). As shown in the table below, the consumption of proline and xylose were more greater during the preparation of CMX-DES2 showing that proline and xylose are more reactive when combined as a liquid eutectic mixture and react faster to form volatile compounds.

Initial and final concentration of xylose and proline are shown in the table below:

|  | Initial concentration before creamer processing (dry matter) | Final concentration in CMX-REF 2 | Final concentration in CMX-DES 2 |
| --- | --- | --- | --- |
| Xylose | 1056 mg/100 g | 70 mg/100 g | n.d. |
| Proline | 1464 mg/100 g | 1182 mg/100 g | 733 mg/100 g |

Volatiles Formed:

Volatiles were analysed by GC-MS/SPME (Solid Phase Micro Extraction): 2 g flavoured creamer powders were dissolved in 2 mL Millipore water containing 10 µL of 1-pentanol solution (500 ppm, diluted in Millipore water) as internal standard for semi-quantification. The reaction sample vials were transported by the auto-sampler to the Gerstel incubator for sample equilibrium at 40° C. for 15 min with stirring. The headspace was sampled by introduction of the SPME fibre into the vial (SPME Fiber Polydimethylsiloxane/Divinylbenzene PDMS-DVB 651 µm 23 gauge needle, Supelco No 57345-U) at 40° C. After 10 min adsorption, the fibre was transported into the injector port in splitless mode at 250° C. for 5 min to desorb and transfer volatile compounds into the chromatographic column. The injector was equipped with a 0.75 mm i.d. liner (Supelco). GC separation was performed on a DB-1701 HP-5MS column of 30 m length, 0.25 mm ID and 0.25 µm film thickness (Agilent No 1220732). The oven (Agilent Technologies 6890A GC oven) temperature program was: 30° C. during 3 min, then heated at 6° C./min until 240° C., and held for 15 min. The GC was coupled to a MS (Agilent Technologies 5973) mass selective detector operating in EI/TIC (70 eV) mode. Peak identification was tentatively done by comparison with theoretical MS spectra and Kovats Indices. Experimental retention indices were obtained by the injection of an alkane solution (C5-C18 fraction). The relative quantitation was carried out by calculating the following ratio:

$$R = \frac{Area_{Compound}}{Area_{pentanol}}$$

Figure 2:
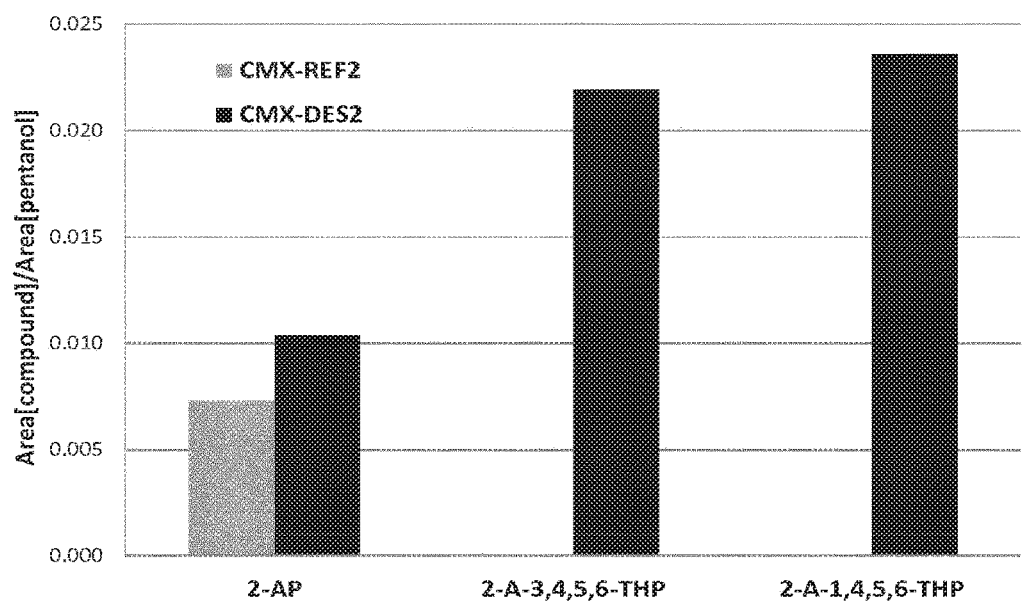
FIG. 2 shows the generation of the volatiles, 2-acetylpyroline (2-AP), 2-acetyl-3,4,5,6-tetrahydropyridine (2-A-3,4,5,6-THP) and 2-acetyl-1,4,5,6-tetrahydropyridine (2-A-1,4,5,6-THP) in the creamer powders of Example 1 produced without a liquid eutectic mixture (CMX-REF2) and with a liquid eutectic mixture (CMX-DES2).

FIG. 2 summarizes the results of semi-quantification of proline specific volatiles, 2-acetyl-pyroline (2-AP) and acetyl-tetrahydropyridines (respectively, 2-A-3,4,5,6-THP and 2-A-1,4,5,6-THP). In the sample where proline and xylose were combined as a liquid eutectic mixture (CMX-DES2), more 2-AP was formed than in the sample where no liquid eutectic mixture was formed (CMX-REF2). 2-A-3,4,5,6-THP and 2-A-1,4,5,6-THP were only detected in the liquid eutectic mixture sample, showing that these volatiles, actively contributing to the bread, biscuit aroma of flavoured creamer powders are formed in greater amounts when the aroma precursors (proline and xylose) were pre-combined as a liquid eutectic mixture during the process.

Figure 3:
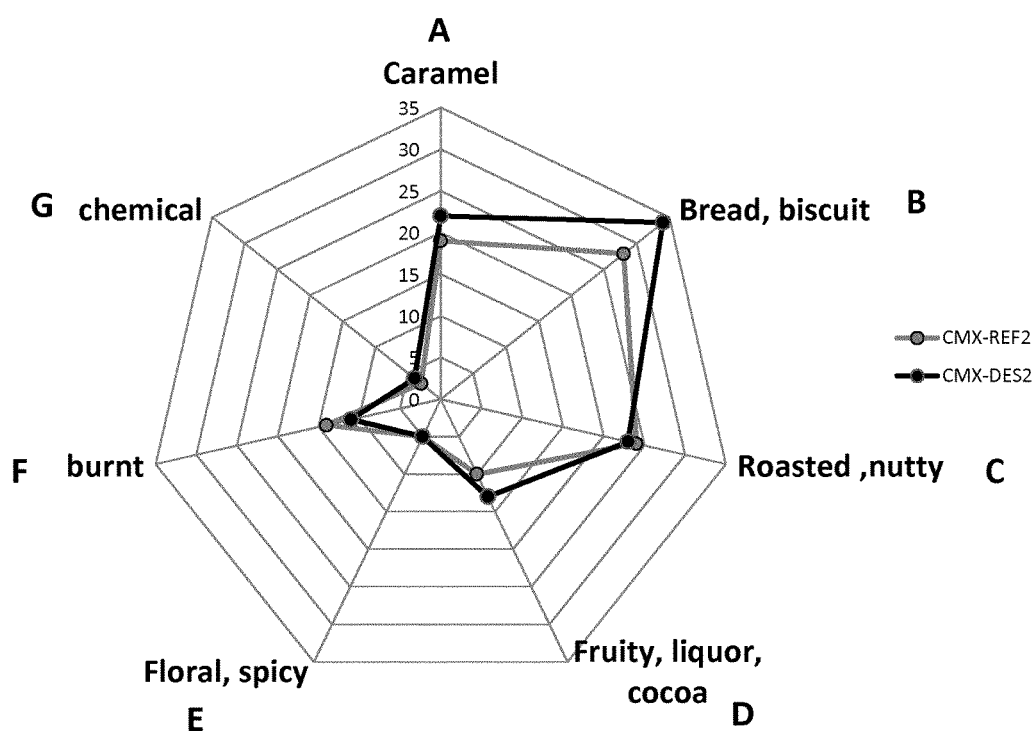
FIG. 3 shows sensory results for coffee mix beverages of Example 1, produced with a creamer having flavour precursors prepared without a liquid eutectic mixture (CMX-REF2) and with a liquid eutectic mixture (CMX-DES2), the sensory attributes being; caramel (A), bread, biscuit (B), roasted, nutty (C), fruity, liquor, cocoa (D), floral, spicy (E), burnt (F) and chemical (G).

Sensory Evaluation:

Coffee mix beverages were prepared by mixing flavoured creamer powder (6 g), sucrose (10 g) and soluble coffee (2 g) in 150 mL hot water. Volunteers were asked to taste the beverages and evaluate the following sensory attributes on a 50 point scale: caramel (A), bread/biscuit (B), roasted/Nutty (C), Fruity, liquor cocoa (D), Floral/spicy (E), burnt (F), and chemical notes (G). Sensory Results are depicted in FIG. 3. The coffee mix beverage prepared from CMX-DES2 (liquid eutectic mixture) led to more intense caramel (A), bread/biscuit (B) aromas compared to the coffee mix prepared from CMX-REF2. All of these aromas were stronger than in the reference where the creamer had no added flavour.

Example 2: Preparation of Flavoured Creamer Powders: Glycine, Rhamnose, Lysine and Fructose A flavour precursor composition was prepared by combining 0.502 kg glycine, 0.55 kg rhamnose, 1.12 kg lysine HCl, 1.807 kg fructose and 0.116 kg disodium hydrogen phosphate, 5.355 kg water and 43.89 kg hydrogenated palm kernel oil. The quantity of water would be sufficient to dissolve any of the polyols or amino compounds individually at 25° C. The mixture was heated in a closed reactor at 110° C. for 40 min and then cooled down to room temperature to generate a process flavour composition (REF-TPF_1).

Another flavour precursor composition was prepared, this time as a liquid eutectic mixture, by combining 0.502 kg glycine, 0.55 kg rhamnose, 1.12 kg lysine HCl, 1.807 kg fructose and 0.116 kg disodium hydrogen phosphate and 2.14 kg water. The components were mixed until the all components dissolved and a homogeneous liquid was formed (sample DES_1). This was a liquid eutectic mixture as the maximum solubility of glycine at 25° C. is around 213 g/L, so taken individually 0.502 kg glycine would not dissolve in 2.14 kg water. Similarly the maximum solubility of rhamnose at 25° C. is around 518 g/L, so taken individually 0.55 kg rhamnose would not dissolve in 2.14 kg water. 43.89 kg hydrogenated palm kernel oil was mixed with 6.33 kg DES_1. The mixture was heated in a closed reactor at 110° C. for 40 min and then cooled down to room temperature to generate a process flavour composition (DES-TPF_1).

The process flavours were mixed with aqueous creamer components and processed into powdered creamers as in Example 1.

Figure 4:
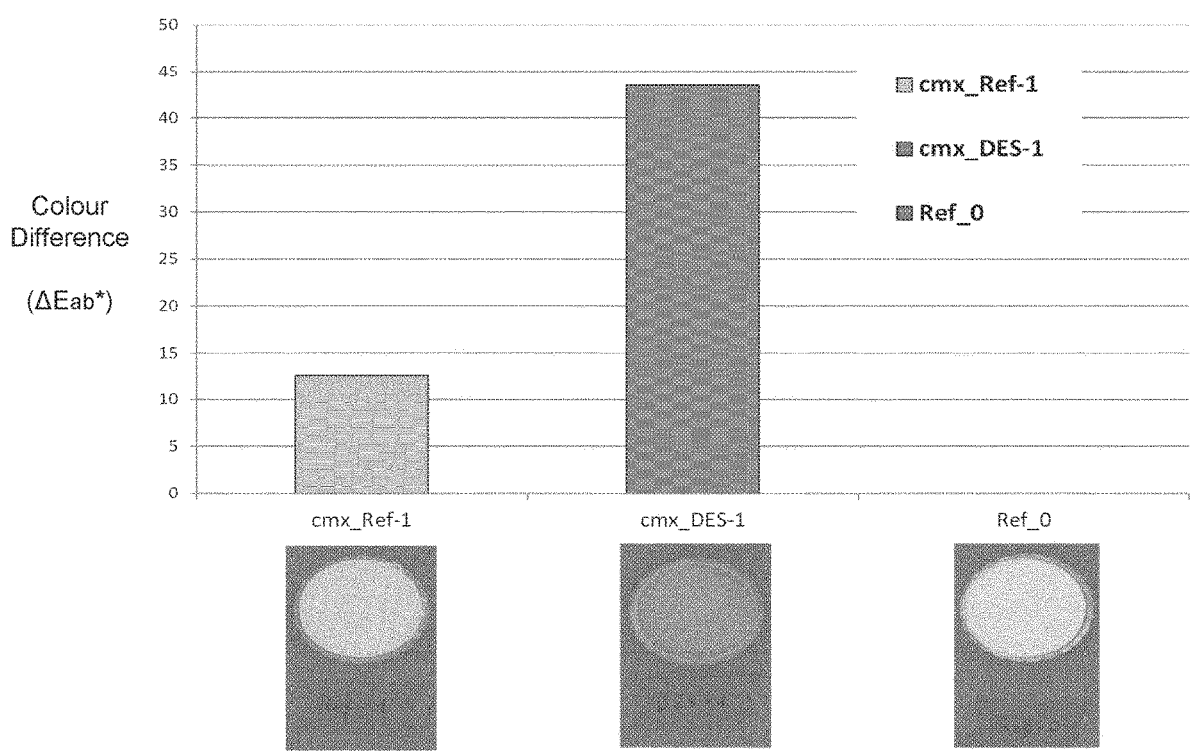
FIG. 4 shows colour measurements of creamer powders from Example 2; Ref_0 with no flavour precursor, cmx_Ref-1 with flavour precursors prepared without a liquid eutectic mixture and cmx_DES-2 with flavour precursor prepared using a liquid eutectic mixture. produced in Example 2
Figure 5:
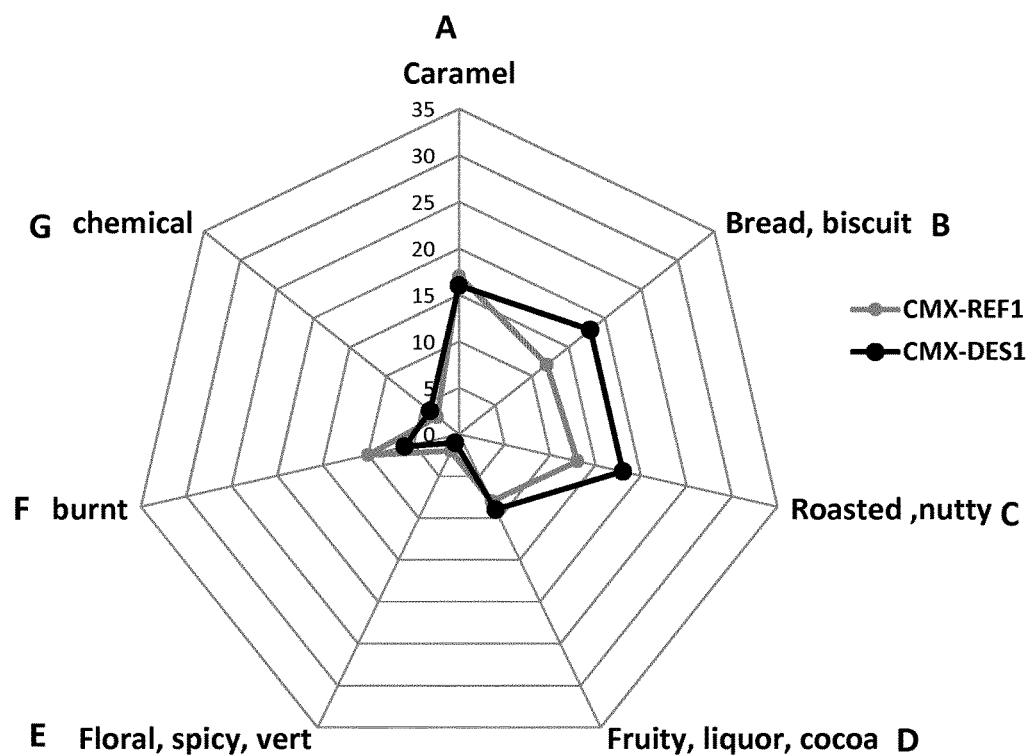
FIG. 5 shows sensory results for coffee mix beverages of Example 2, produced with a creamer having flavour precursors prepared without a liquid eutectic mixture (CMX-REF1) and with a liquid eutectic mixture (CMX-DES1), the sensory attributes being; caramel (A), bread, biscuit (B), roasted, nutty (C), fruity, liquor, cocoa (D), floral, spicy (E), burnt (F) and chemical (G).

Extent of Reaction (Colour):

The colour of the creamer powders was measured in the same manner as described in Example 1 and shown in FIG. 4. ΔEab* of CMX-DES1 was greater than that of CMX-REF1 showing that the browning, and thus Maillard reaction was more advanced when compounds are pre-combined as a liquid eutectic mixture before the heating step.

Sensory Evaluation:

Coffee mix beverages were prepared by mixing flavoured creamer powder (6 g), sucrose (10 g) and soluble coffee (2 g) in 150 mL hot water. Volunteers were asked to taste the beverages and evaluate the following sensory attributes on a 0-50 scale: caramel (A), bread/biscuit (B), roasted/Nutty (C), Fruity, liquor cocoa (D), Floral/spicy (E), burnt (F), and chemical notes (G). Sensory Results are depicted in FIG. 3. The coffee mix beverage prepared from CMX-DES1 (liquid eutectic mixture) led to more intense bread/biscuit (B) and roasted/nutty (C) aromas and less burnt off-flavour (F) than the coffee mix prepared from CMX-REF1. All of these aromas were stronger than in the reference where the creamer had with no added flavour.

Example 3: Generating Process Flavour Compositions with and without Formation of a Liquid Eutectic Mixture A liquid eutectic mixture of rhamnose, lysine, fructose, glycine and $Na_2PO_4$ was formed by mixing 0.47 g glycine, 0.57 g rhamnose, 1.18 g lysine HCl, 1.69 g fructose, 0.106 g disodium hydrogen phosphate and 5 g water using an Ultraturax stirrer until the formation of a homogeneous liquid. 3.2 g hydrogenated palm kernel oil was mixed with 0.547 g of the liquid eutectic mixture and heated in a closed vessel at 120° C. for 5 min and then cooled down to room temperature (performed in triplicate).

For comparison, the a process flavour was generated with the aroma precursors added as solid ingredients: 3.2 g hydrogenated palm kernel oil was mixed with 0.028 g glycine, 0.034 g rhamnose, 0.071 g lysine HCl, 0.102 g fructose and 6.4 mg disodium hydrogen phosphate and 0.300 g water. The heterogeneous mixture was heated in a closed vessel for 5 min at 120° C. and then cooled down to room temperature (performed in triplicate). Note that the components and proportions of the flavour precursors in both compositions were the same, with exactly the same amount of water. The difference was that one was a eutectic liquid and the other a heterogeneous mixture. The eutectic liquid formed an emulsion with the oil, which would make it easier to process industrially, e.g. capable of being readily pumped through pipes without forming blockages.

It can be seen that these process flavour compositions could be formed into a creamer composition in a similar manner as Example 2.

Relative quantification of furaneol by GC-MS/SPME (Solid Phase Micro Extraction): 10 µl 1-Decanol was added in the reaction mixture just before the analysis. Furaneol (4-hydroxy-2,5-demethyl-3(2H)furanone has a sweet caramel aroma. Sample vials were transported from the autosampler to the Gerstel incubator for equilibration at 40° C. for 15 minutes. The headspace was sampled by introduction of the SPME fiber into the vial (SPME Fiber Polydimethylsiloxane/Divinylbenzene PDMS-DVB 65 µm 23 gauge needle, Supelco No 57345-U) at 30° C. After 10 min adsorption, the fiber was transported into the injector port in splitless mode at 250° C. for 5 min to desorb and transfer volatile compounds into the chromatographic column. After 3 min the injector split ratio was increased to 50° C. to clean the fiber. GC separation was performed on a DB-1701 HP-5MS column of 30 m length, 0.25 mm ID and 0.25 µm film thickness (Agilent No 1220732). The oven (Agilent Technologies GC oven) temperature program was: 30° C. during 3 min, then heated at 6° C./min until 240° C., and held for 15 min. The GC was coupled to a MS (Agilent Technologies 5973) mass selective detector operating in EI/TIC (70 eV) mode. The identification of furaneol was confirmed by the comparison with theoretical MS Spectrum and Kovats index. Its relative quantification of furaneol was carried by using the following formula:

$$R=[(Area)]_{compound}/[(Area)]_{Decanol}$$

The results are shown in the table below:

| | Liquid eutectic flavour precursor composition (R) | Solid slurry flavour precursor composition (R) |
|---|---|---|
| Furaneol | 74.06 | 11.9 |

The generation of furaneol was clearly increased when adding aroma precursors as a liquid eutectic flavour precursor composition indicating that the generation of process flavour compositions is enhanced by the formation of liquid eutectic mixtures.

Example 4: Use of Liquid Eutectic Mixtures to Reduce the Amount of Precursor Required Process flavour compositions were generated from L-rhamnose, D-fructose, glycine, L-lysine.HCl and disodium hydrogen phosphate. This mixture of ingredients was found to generate sweet caramel-like flavour, particularly suitable for incorporation in creamers. Several Model Maillard reactions were prepared at lab-scale (reference REF and the corresponding liquid eutectic systems containing 0%, 15%, 30% and 45% less precursors.

Fructose, rhamnose, glycine, lysine.HCl and $Na_2HPO_4$ were weighed and mixed in the same container, see table below. Water was then slowly poured into the resulting powder while stirring with a robot mixer. After addition, the mix was stirred for additional 30 minutes until getting a white/yellow oily solution ($DES_{prec}$).

| Ingredient | Quantity (g/100 g) |
|---|---|
| Fructose | 28.07 |
| Rhamnose | 9.47 |
| L-Lysine HCl | 19.56 |
| Glycine | 7.88 |
| Disodium phosphate | 1.77 |
| Water | 33.24 |

Reference process flavour composition (REF-100%): 4.100 g hydrogenated palm oil was mixed with 47 mg glycine, 57 mg rhamnose, 118 mg lysine HCl, 169 mg fructose, 10.6 mg disodium hydrogen phosphate and 0.5 g water. In this high water content reference composition, all the precursors would be soluble individually in this quantity of water. The mixture was heated under stirring in a closed vessel at 120° C. for 20 minutes and then cooled down to room temperature (performed in triplicate).

Process flavour composition prepared from liquid eutectic mixtures (DES-100%): 4.400 g hydrogenated palm oil were mixed with 601 mg $DES_{prec}$. The mixture contained the same quantities of flavour precursors as the reference and was heated under stirring in a closed vessel at 120° C. for 20 minutes and then cooled down to room temperature (performed in triplicate).

Process flavour composition prepared from $DES_{prec}$ with 15% less aroma precursors than the reference system (DES-85%): 4.400 g hydrogenated palm oil were mixed with 511 mg $DES_{prec}$. The mixture was heated under stirring in a closed vessel at 120° C. for 20 minutes and then cooled down to room temperature (performed in triplicate).

Process flavour composition prepared from DES$_{prec}$ with 30% less amount of aroma precursors than the reference system (DES-70%): 4.400 g hydrogenated palm oil were mixed with 421 mg DES$_{prec}$. The mixture was heated under stirring in a closed vessel at 120° C. for 20 minutes and then cooled down to room temperature (performed in triplicate).

Process flavour composition prepared from DES$_{prec}$ with 45% less amount of aroma precursors than the reference system (DES-55%): 4.400 g hydrogenated palm oil were mixed with 331 mg DES$_{prec}$. The mixture was heated under stirring in a closed vessel at 120° C. for 20 minutes and then cooled down to room temperature (performed in triplicate). All the flavour precursor compositions using DES$_{prec}$ formed an emulsion with the oil.

Detailed recipes of the flavour precursor composition for each process flavour composition is shown in the table below:

| Ingredients | REF-100% mg | DES-100% mg | DES-85% mg | DES-70% mg | DES-55% mg |
|---|---|---|---|---|---|
| Fructose | 169.00 | 169.00 | 143.65 | 118.47 | 92.95 |
| Rhamnose | 57.00 | 57.00 | 48.45 | 39.96 | 31.35 |
| Disodium phosphate | 10.65 | 10.65 | 9.05 | 7.47 | 5.86 |
| Glycine | 47.40 | 47.40 | 40.29 | 33.23 | 26.07 |
| L-Lysine HCl | 117.70 | 117.70 | 100.04 | 82.51 | 64.73 |
| Water | 500 | 200 | 170.0 | 140 | 110 |
| Total precursors/alkali/water | 901.65 | 601.65 | 511.40 | 421.75 | 330.90 |
| Hydrogenated palm kernel oil (mg) | 4100 | 4400 | 4400 | 4400 | 4400 |
| Total | 5001.65 | 5001.65 | 4911.40 | 4821.75 | 4730.90 |

Quantification of Residual Sugars (Rhamnose & Fructose):

1 mL water was added to the Maillard mixtures and then oil was removed by extraction with pentane (8 mL×3). The aqueous layers were centrifuged at 3400 t/min for 20 min at 8° C. The resulting solution was then diluted (15 μL for 100 mL). Each sample was analyzed by Anion Exchange Liquid Chromatography using an ICS 5000 Dionex EGC III KOH. The runtime was 30 min with a gradient mode between 20-100 mM (0 to 13 min C=20 mM, 13 to 20 min C=100 mM, 20 to 30 min C=20 mM). The flow was 0.350 mL/min and the injection volume was 10 μL. The eluent was a generator cartridge of potassium hydroxide and the column was a Dionex CarboPac PA1 with a dimension of 2×50 mm. The system consisted in a quaternary pump, a thermostated autosampler, a column oven at 30° C., an electrode AgCl and a pulsed amperometry detector. A mix of standard sugars was used to create a calibration curve.

Quantification of Residual Amino Acids (Glycine & Lysine):

The quantification of residuals amino acids was carried out by Triple quad/LC-MS: After extraction with pentane, the samples were diluted in Millipore water, filtered (0.45 μm, disposable syringe filter for aqueous sample) and diluted with a mix of labelled standards (Dr Ehrenstorfer CDN Isotopes) composed of seven labelled AA (L-alanine-2-d1, glycine-2,2-d2, L-phenyl-d5-alanine, L-proline-2,5,5-d3, L-serine-2,3,3-d3, L-threonine-2,3-d2, L-valine-d8) in a concentration of 100 μM (final concentration: 50 μM). Table below shows the mass transitions of quantified amino acids.

| Substance | MW [Da] | Q1→Q3 [m/z] | Frag$^a$ [V] | CE$^b$ [V] | Cell Acc$^c$ [V] |
|---|---|---|---|---|---|
| L-Serine-d$_3$ | 108 | 109 → 63 | 80 | 8 | 7 |
| L-Alanine-d$_1$ | 90 | 91 → 45 | 15 | 8 | 7 |
| L-Phenylalanine-d$_5$ | 170 | 171 → 125 | 110 | 8 | 7 |
| L-Threonine-d$_2$ | 121 | 122 → 76 | 80 | 8 | 7 |
| L-Glycine | 75 | 76 → 30 | 45 | 1 | 7 |
| L-Glycine-d$_2$ | 77 | 78 → 32 | 15 | 8 | 7 |
| L-Valine-d$_8$ | 125 | 126 → 80 | 80 | 8 | 7 |
| L-Lysine | 146 | 147 → 84 | 50 | 20 | 7 |
| L-Proline-d$_3$ | 118 | 119 → 73 | 80 | 8 | 7 |

$^a$fragmentation voltage;
$^b$Collision energy;
$^c$Cell energy

The samples and the standards for calibration were injected in HILIC HPLC-MS-QQQ (Agilent 1290 Infinity system) to quantify the unreacted glycine and lysine. The samples were directly separated on a Hydrophilic Interaction Liquid Chromatography (HILIC) column (TOSOH BIO-SEP; HILIC, TSK gel Amide-80, dimension 4.6 mm ID×15 cm, particle size 3. μm.), especially designed for the separation of hydrophilic polar and ionic analysts. The column temperature was maintained constant at 35° C. Mixes of acetonitrile/water/formic acid 10/90/0.1 (A) and 90/10/0.1 ratio (B) were used as eluents. The flow rate was 0.8 mL/min. The solvent gradient started at 75% (eluent B) at 0 min and stayed unchanged for 5 min then it was reduced at 50% B in 1 min and remained stable for 4 min. The gradient came back at 75% B in 1 min and the run was finished 4 min later. The runtime was 15 min with an additional post-time minute before the next injection. In the source (ESI), the gas temperature and the flow were respectively 300° C. and 5.1 I/min and the nebulizer was set at 45 psi. The sheath Gas Heater and flow were 255° C. and 11 I/min. The capillary voltage was set at 3,000 V (+) and 2,000 V (−) and the nozzle voltage was 500 V. The mix of labelled amino acids was used as internal standard and added to mix of Amino Acids (Pierce) to create the calibration curve for quantification (5-50 μM by step of 5 μM. The data collected were treated in order to deliver the amount of the free amino acids in each sample, based on the 10 point calibration curve.

Figure 6:
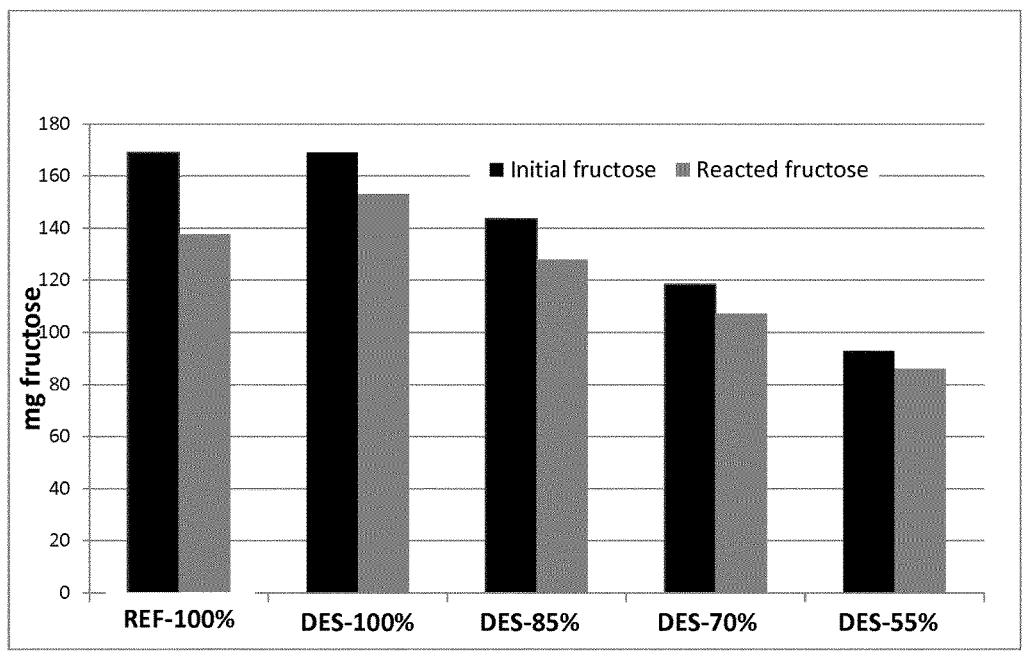
FIG. 6 shows the amount of D-fructose consumed during heating different flavour precursor mixtures in Example 4.

FIG. 6 shows the initial and reacted fructose after heating the different flavour precursor compositions, when the same amount of reducing sugars and amino acids were used, 137 mg fructose were reacted in the REF while 153 mg in the DES-100% confirming the higher reactivity of precursors if pre-combined as liquid eutectic mixtures. We can also observe that using liquid eutectic mixtures of precursors it is possible to reduce aroma precursor loading by 15% while achieving the similar consumption of fructose after heating.

Aldoses are more reactive than ketoses. Under these heating conditions, the rhamnose was quickly and completely degraded for all flavour precursor compositions after 20 minutes at 120° C.

Figure 7:
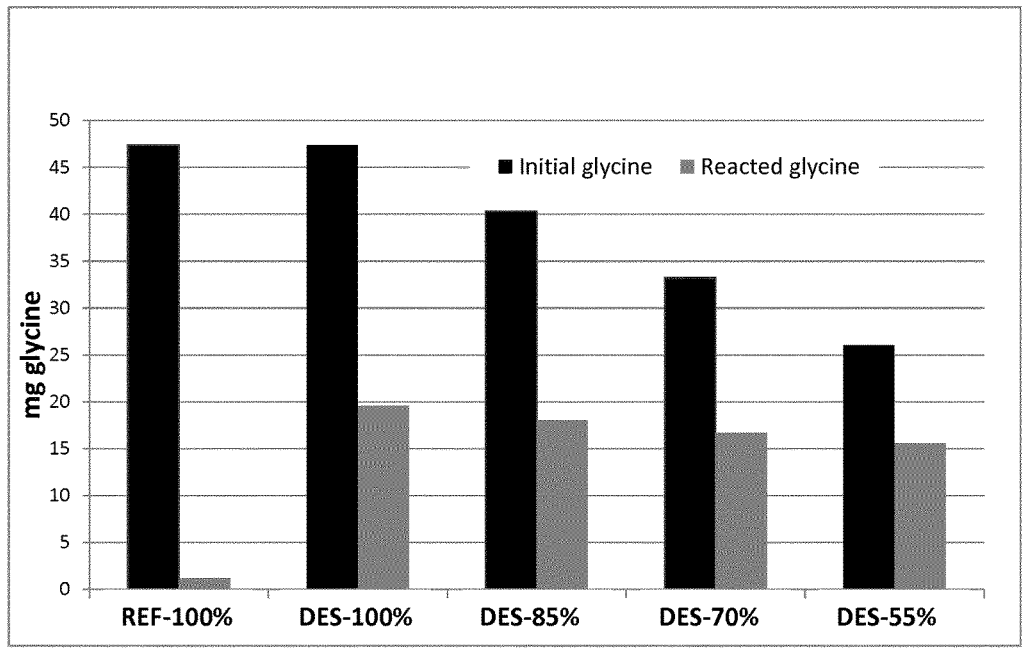
FIG. 7 shows the amount of glycine consumed during heating different flavour precursor mixtures in Example 4.

FIG. 7 shows that the consumption of glycine was higher when DES$_{prec}$ was used. Only 1 mg glycine was consumed in the model flavour precursor composition REF compared to 15 mg in the DES-55% containing 45% less aroma precursors.

Figure 8:
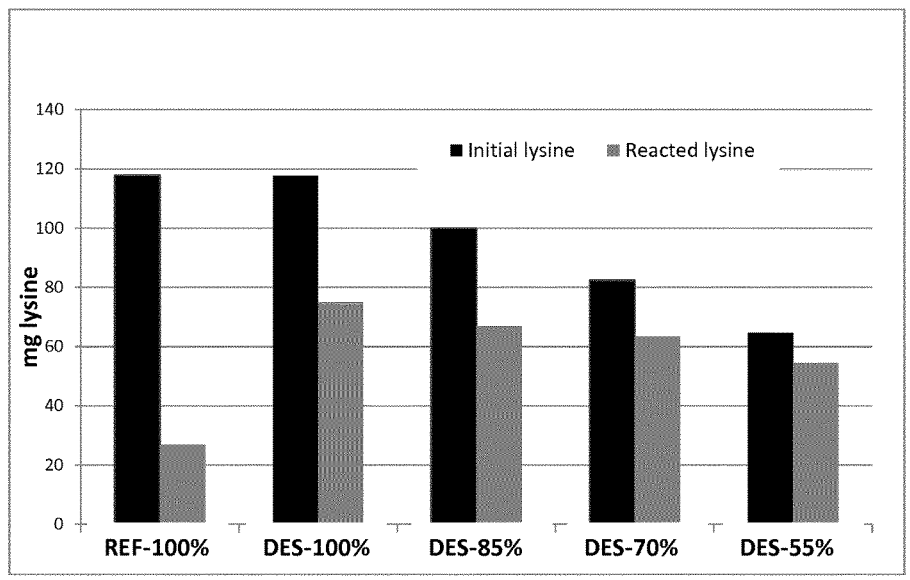
FIG. 8 shows the amount of lysine consumed during heating different flavour precursor mixtures in Example 4.

FIG. 8 shows that the same trend is observed for the consumption of lysine: Incorporating ingredients as DES$_{prec}$ enhanced their reactivity. In the case of lysine, the consumption was 2 to 3 times more important with the DES$_{prec}$ than in the standard diluted reference REF.

Volatile Analysis by Headspace SPME (Solid Phase Micro Extraction)/GC-MS:

Process flavour compositions were introduced to the SPME vials with 0.5 µL of 1-pentanol solution (500 ppm, diluted in Millipore water) as internal standard.

The fiber (SPME Fiber PDMS-DVB 65 µm 23 gauge needle, Supelco No 57345-U) was exposed for 10 min at 40° C. to the headspace above the samples. After sampling, the fibre was transported into the injector port in splitless mode at 250° C. for 10 min to desorb and transfer volatile compounds into the chromatographic column. The injector was equipped with a 0.75 mm i.d. liner (Supelco). GC separation was done on a DB-1701 HP-5MS column (Agilent, 30 m length, 0.25 mm internal diameter and 0.25 µm film thicknesses). The GC oven temperature program (Agilent Technologies 6890 GC oven) started at 30° C. during 3 min then heated at 6° C./min until 240° C. and held 10 min. The GC was coupled to a MS (Agilent Technologies 5973) mass selective detector operating in EI/TIC (70 eV) mode. For the calculation of the isotopic proportions, the values were corrected by subtracting the naturally occurring percentages of $^{13}C$ in $M^++1$. The relative quantification was carried out in triplicate on each process flavour composition and the ratio R was defined as following:

$$R = \frac{Area_{Compound}}{Area_{1-Pentanol}}$$

Figure 9:
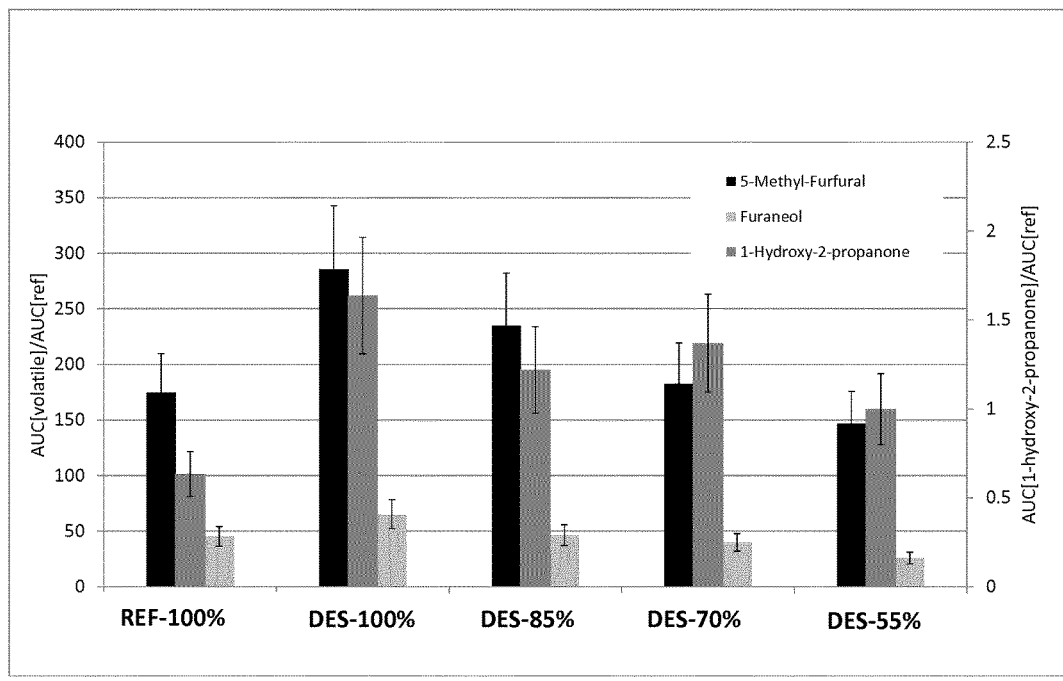
FIG. 9 shows the generation of the volatiles 1-hydroxy-2-propanone, furaneol and 5-methylfurfural from the flavour precursor mixtures of Example 4.

The results of the semi-quantification of 1-hydroxy-2-propanone, furaneol and 5-methylfurfural carried out by headspace SPME GC-MS are shown in FIG. 9. These compounds are known to contribute to a caramel-like flavour. The concentration of the three selected aroma compounds increased when aroma precursors were incorporated as liquid eutectic mixtures. 5-Methylfurfural was generated in greater amount using liquid eutectic mixtures even from 45% less aroma precursors (DES-55%). The same trend was observed for the 1-hydroxy-2-propanone. The trend was less marked for the furaneol, however, a reduction of 15-30% aroma precursors could be achieved while maintaining the same level of furaneol as in the REF.

In conclusion, the level of volatiles of these flavour molecules could be maintained with a reduction of 15% to 30% of the ingredients precursors by processing the flavour precursor composition as a liquid eutectic mixture.

Example 5: Evaluation of Flavoured Creamer Powders: Dextrose, Rhamnose, Xylose and Proline A flavour precursor composition was prepared by combining 11 g dextrose anhydrous, 11 g rhamnose, 10 g xylose, 100 g proline, 9 g disodium hydrogen phosphate, 300 g water and 2.56 kg hydrogenated palm kernel oil. The quantity of water would be sufficient to dissolve any of the polyols or amino compounds individually at 25° C. The mixture was heated in a closed reactor at 90° C. for 10 min and then cooled down to room temperature to generate a process flavour composition (REF-7).

Another flavour precursor composition was prepared, this time as a liquid eutectic mixture, by combining 11 g dextrose anhydrous, 11 g rhamnose, 10 g xylose, 100 g proline, 9 g disodium hydrogen phosphate and 53 g water. The components were mixed until all components dissolved and a homogeneous liquid was formed. This was a liquid eutectic mixture as the maximum solubility of proline at 25° C. is around 1744 g/L, so taken individually 100 g proline would not dissolve in 53 g water. 2.8 kg hydrogenated palm kernel oil was mixed with the liquid eutectic mixture and heated in a closed reactor at 90° C. for 10 min and then cooled down to room temperature to generate a process flavour composition (DES-7).

Creamers were then prepared. Typical non-dairy creamer ingredients (sodium caseinate, dipotassium phosphate, sodium hexametaphosphate and trisodium citrate) were mixed in water and stirred at 50° C. These aqueous creamer components were then mixed with the process flavour composition (containing oil) to which emulsifiers monoglyceride Dimodan™ and Panodan™ had been added. The mixture was stirred at 50° C. and glucose syrup DE was added. The final mix was homogenized to form an emulsion and pasteurized (85° C. for 5 seconds). The pasteurized mix was then spray-dried at 160° C. to form a creamer powder. Flavoured creamer powder CMx-REF7 was prepared with process flavour REF-7, and flavoured creamer powder CMx-DES7 with process flavour DES-7.

Sensory Evaluation

Figure 10:
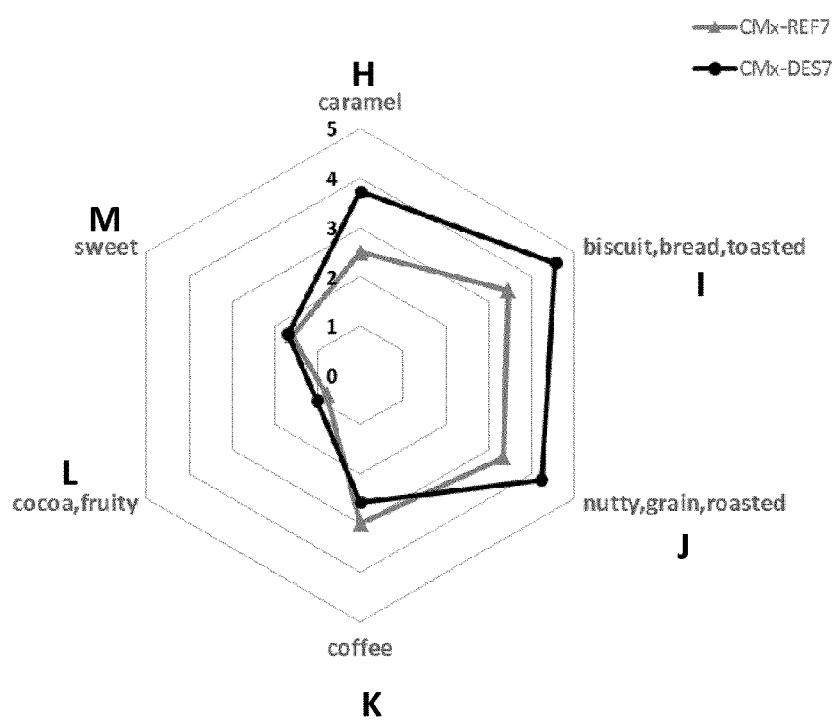
FIG. 10 shows sensory results for coffee mix beverages of Example 5, produced with a creamer having flavour precursors prepared without a liquid eutectic mixture (CMX-REF7 ▲) and with a liquid eutectic mixture (CMX-DES7 ●), the sensory attributes being; caramel (H), biscuit, bread, toasted (I), nutty, grain, roasted (J), coffee (K), cocoa, fruity (L) and sweet (M).

Coffee mix beverages were prepared by mixing corresponding flavoured creamer powder (6 g), sucrose (10 g) and soluble coffee (2 g) in 150 mL hot water. Ten volunteers were asked to taste the beverages and evaluate the following sensory attributes (aroma) on a 10-point continuous scale: caramel, bread/biscuit/toasted, roasted/nutty/grain, coffee, cocoa/fruity, sweet. Sensory results are depicted in FIG. 10. The coffee mix beverage prepared from CMx-DES7 (liquid eutectic mixture) led to more intense caramel, bread/biscuit/toasted and nutty/grain/roasted aromas compared to the coffee mix prepared from CMx-REF7.

Extent of Reaction (Residual Precursors):

To investigate the extent of reaction of the flavour precursors the residual sugars (dextrose, rhamnose and xylose) and proline were quantified in the flavour compositions (REF-7 and DES-7). Results are expressed as the percentage of precursors reacted after thermal process (calculated as follows: (quantity of initial sugars−quantity of remaining sugars)/quantity of initial sugars*100).

For residual sugars, 100 mg of the flavour composition was diluted in 100 mL Millipore water. An aliquot (5 mL) was then filtered through a 0.45 µm syringe filter (Whatman, 25 mm GD/X, Cat. No. 6872-2504) and diluted for sample analysis as described in Example 4.

For proline, the flavour composition was extracted with hydrochloric acid/buffer. Extracts were analyzed with a SYKAM amino-acid analyzer (LCA K07, 150×4.6 mm column, lithium buffer) with detection at 440 nm (post-column-derivatisation with ninhydrin).

Figure 11:
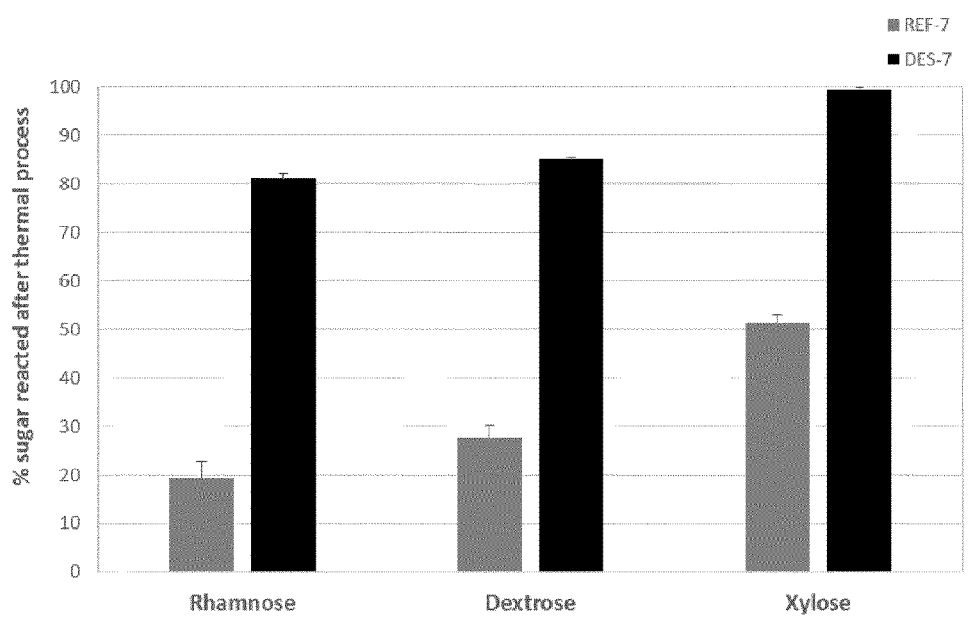
FIG. 11 shows the percentage of precursors reacted after thermal process in Example 5. Flavour precursor composition without liquid eutectic mixture (REF-7) in lighter shade than the flavour precursor composition using a liquid eutectic mixture (DES-7). The sugars, from left to right, are rhamnose, dextrose and xylose.
Figure 12:
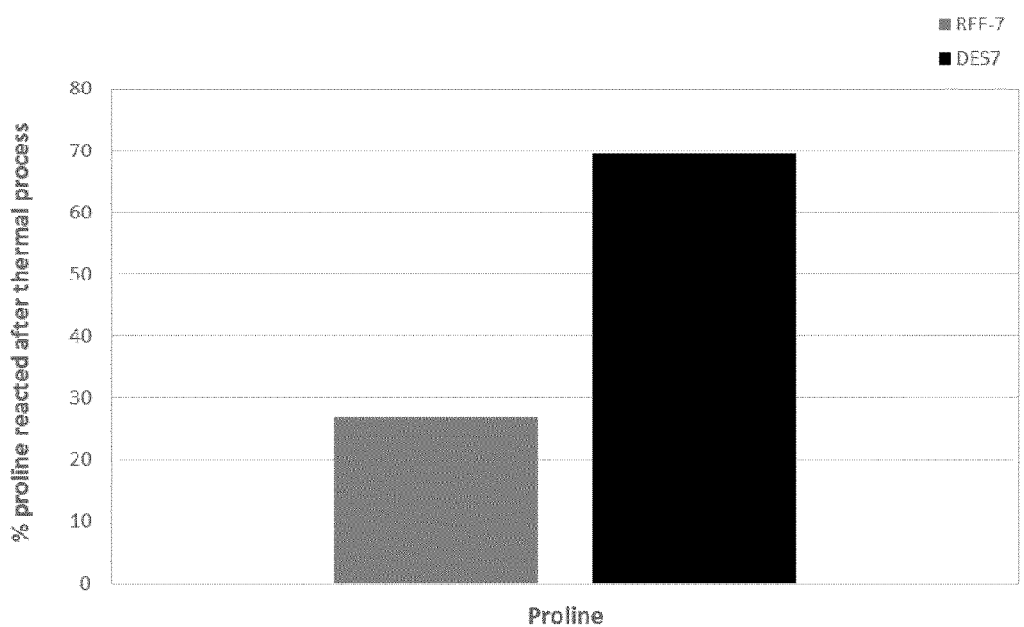
FIG. 12 shows percentage of proline reacted after thermal process in Example 5. Flavour precursor composition without liquid eutectic mixture (REF-7) in lighter shade than the flavour precursor composition using a liquid eutectic mixture (DES-7).

As seen in FIGS. 11 and 12, the percentage of precursors reacted (sugar and amino acid) is higher for DES-7 than for REF-7, indicating a greater reactivity of the system when used as a liquid eutectic mixture.

Figure 13:
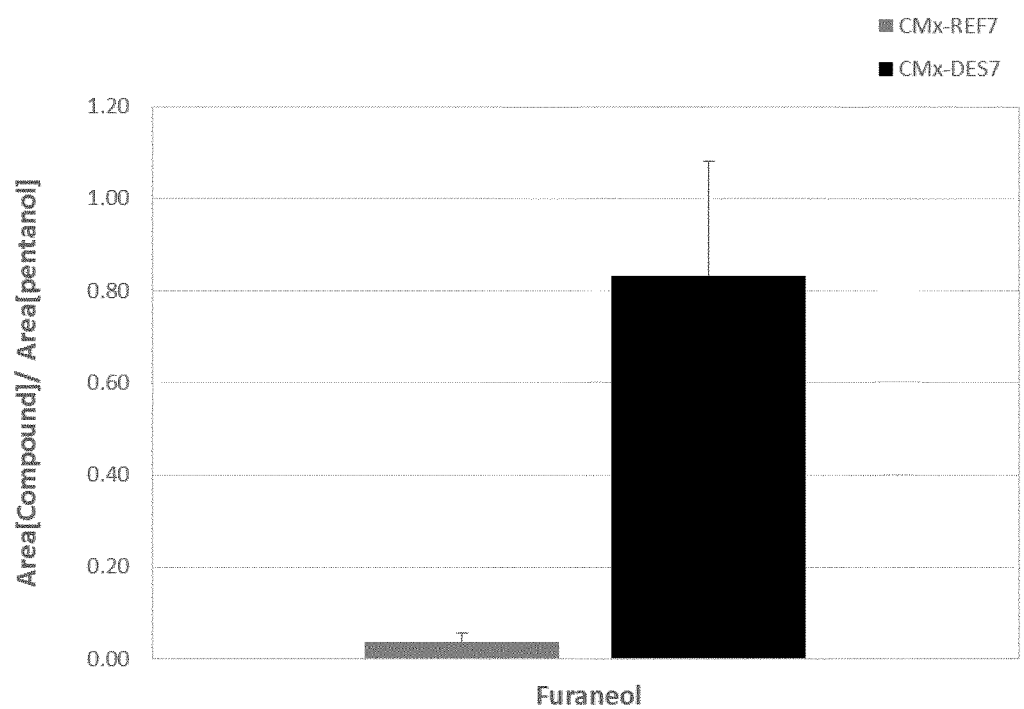
FIG. 13 shows the generation of the volatile furaneol from the flavoured creamer powders (CMx-REF7 and CMx-DES7) of Example 5.
Figure 14:
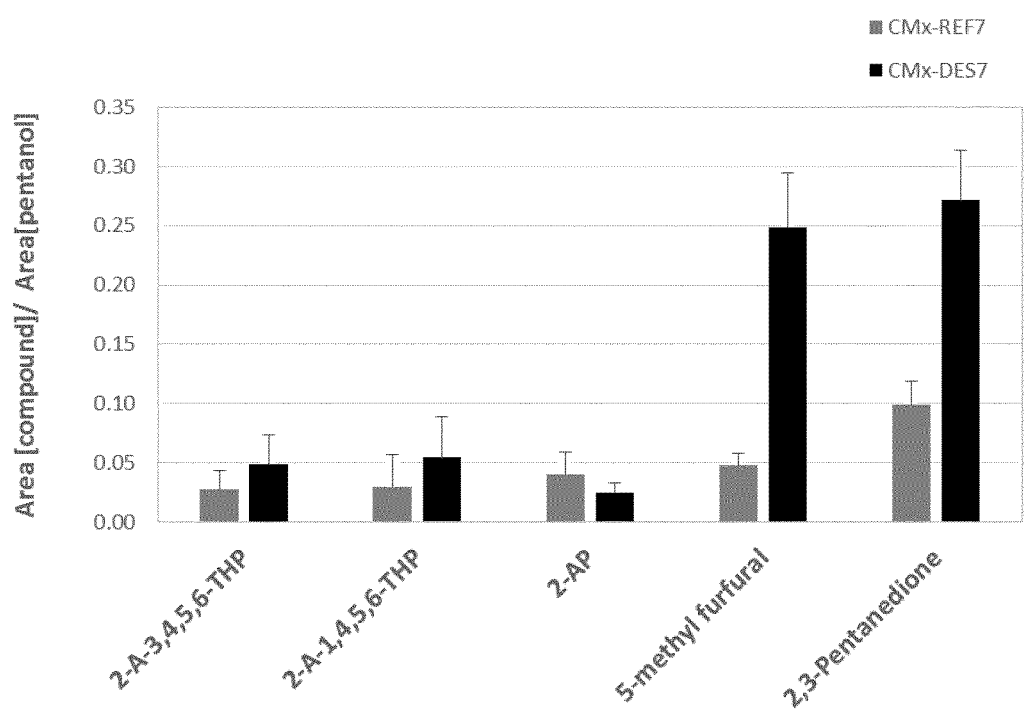
FIG. 14 shows the generation of the volatiles 2-acetyl-3,4,5,6-tetrahydropyridine (2-A-3,4,5,6-THP), 2-acetyl-1,4,5,6-tetrahydropyridine (2-A-1,4,5,6-THP), 2-acetylpyroline (2-AP), 5-methyl furfural and 2,3-pentanedione from the flavoured creamer powders (CMx-REF7 and CMx-DES7) of Example 5.

Extent of Reaction (Volatiles Formed):

To investigate the extent of reaction between amino acid and sugars upon thermal processing, some specific volatiles (i.e., products of the reaction) were analyzed as in Example 1. Volatiles were analysed by GC-MS/SPME: 2 g flavoured creamer powders were dissolved in 2 mL Millipore water containing 1 µL of 1-pentanol solution (500 ppm, diluted in Millipore water) as internal standard for semi-quantification. Differences are expected as there were differences in the percentage of precursors reacted between DES-7 and REF-7. FIGS. 13 and 14 summarizes the semi-quantitative results.

For proline-specific volatiles, 2-acetylpyroline (2-AP) and acetyl-tetrahydropyridines (2-Acetyl-3,4,5,6-tetrahydropyridine 2-A-3,4,5,6-THP, and 2-Acetyl-1,4,5,6-tetrahydropyridine 2-A-1,4,5,6-THP), there were no clear differences between DES and REF flavour systems. However, for sugar-derived volatiles, levels of furaneol, 5-methyl furfural, 2,3-pentanedione were higher for DES-7 than for REF-7. These compounds contribute to aroma notes such as caramel/sweet, bready/brown/coffee-like, buttery/nutty/toasted/caramellic, respectively, which is in line with the sensory results found for flavoured coffee mix CMx-DES-7.

The invention claimed is:

1. A process for manufacturing a creamer composition, the process comprising:
providing a flavor precursor composition comprising at least one polyol and at least one amino compound, wherein the at least one amino compound is selected from the group consisting of amino acids, amino acid derivatives and peptides, wherein the at least one polyol and the at least one amino compound are materials solid at 25° C., wherein the at least one polyol and the at least one amino compound are combined with water and/or glycerol to form a liquid eutectic mixture, the amount of water and/or glycerol being insufficient to dissolve the at least one polyol or the at least one amino compound individually at 25° C., or the amount of water and/or glycerol being such that all the at least one polyol and all the at least one amino compound are simultaneously saturated at 25° C., and wherein the at least one polyol is selected from the group consisting of glycerol, sorbitol, glucuronic acid, 5-keto-gluconic acid, galacturonic acid, iduronic acid, maltodextrin, glucose syrup, rhamnose, xylose, glucose, fructose, sucrose, lactose, maltose, xylitol, maltitol, erythritol, mannitol and mixtures thereof;
heating the flavor precursor composition to generate a process flavour composition; and
mixing the process flavor composition with an aqueous creamer component.

2. The process according to claim 1, wherein the at least one amino compound is selected from the group consisting of glycine, alanine, valine, norvaline, leucine, norleucine, aspartic acid, glutamic acid, asparagine, glutamine, arginine, lysine, serine, threonine, proline, tyrosine, cysteine, cystine, methionine, phenylalanine, histidine, tryptophan, dihydroxyphenylalanine, taurin, thiamine, carnosine and mixtures thereof.

3. The process according to claim 1, wherein the at least one polyol is a reducing sugar.

4. The process according to claim 1, wherein the at least one polyol is selected from the group consisting of rhamnose, xylose, fructose and combinations of these, and the at least one amino compound is selected from the group consisting of glycine, lysine and combinations of these.

5. The process according to claim 1, wherein the flavor precursor composition comprises an alkali.

6. The process according to claim 1, wherein the flavor precursor composition comprises an oil and the process flavour composition is mixed with the aqueous creamer component to form an oil-in-water emulsion.

7. The process according to claim 6 further comprising drying the oil-in-water emulsion to a powder.

8. The process according to claim 1, wherein the aqueous creamer component comprises protein.

9. A process for providing a coffee mix, the process comprising:
manufacturing a creamer composition by providing a flavor precursor composition comprising at least one polyol and at least one amino compound selected from the group consisting of amino acids, amino acid derivatives and peptides, wherein the at least one polyol and the at least one amino compound are materials solid at 25° C. and wherein the at least one polyol and the at least one amino compound are combined with water and/or glycerol to form a liquid eutectic mixture, the amount of water and/or glycerol being insufficient to dissolve the at least one polyol or the at least one amino compound individually at 25° C., or the amount of water and/or glycerol being such that all the at least one polyol and all the at least one amino compound are simultaneously saturated at 25° C., and wherein the at least one polyol is selected from the group consisting of glycerol, sorbitol, glucuronic acid, 5-keto-gluconic acid, galacturonic acid, iduronic acid, maltodextrin, glucose syrup, rhamnose, xylose, glucose, fructose, sucrose, lactose, maltose, xylitol, maltitol, erythritol, mannitol and mixtures thereof;
heating the flavor precursor composition to generate a process flavour composition;
mixing the process flavor composition with an aqueous creamer component to form the creamer composition; and
combining the creamer composition with soluble coffee to form the coffee mix.

10. The process according to claim 1, wherein the liquid eutectic mixture has a melting point below −40° C.

11. The process according to claim 1, wherein the liquid eutectic mixture has a melting point at least 20° C. lower than the lowest individual melting point of the at least polyol, the at least one amino compound, and the water and/or glycerol.

12. The process according to claim 6, wherein the oil is in an amount of at most about 50 wt. % of the creamer composition.

13. The process according to claim 1, wherein the creamer composition comprises 5-methylfurfural, 1-hydroxy-2-propanone and furaneol.

14. The process according to claim 1, wherein the creamer composition comprises at least 1 µg/g of 5-methylfurfural.

15. The process according to claim 1, wherein the creamer composition comprises at least 100 µg/g of furaneol.

* * * * *